US012646077B2

(12) United States Patent
Ieta et al.

(10) Patent No.: US 12,646,077 B2
(45) Date of Patent: Jun. 2, 2026

(54) INFORMATION PROCESSING APPARATUS AND INFORMATION PROCESSING METHOD

(71) Applicant: ZOZO, Inc., Chiba (JP)

(72) Inventors: Tsuyoshi Ieta, Chiba (JP); Shunsuke Minemura, Chiba (JP)

(73) Assignee: ZOZO, INC., Chiba (JP)

( * ) Notice: Subject to any disclaimer, the term of this patent is extended or adjusted under 35 U.S.C. 154(b) by 35 days.

(21) Appl. No.: 18/411,779

(22) Filed: Jan. 12, 2024

(65) Prior Publication Data

US 2024/0144291 A1     May 2, 2024

Related U.S. Application Data

(63) Continuation of application No. PCT/JP2022/027898, filed on Jul. 15, 2022.

(30) Foreign Application Priority Data

Jul. 29, 2021     (JP) ................................. 2021-124740

(51) Int. Cl.
*G06Q 30/016*          (2023.01)
*A43D 1/02*           (2006.01)
(52) U.S. Cl.
CPC ............. *G06Q 30/016* (2013.01); *A43D 1/02* (2013.01)
(58) Field of Classification Search
CPC ................................. G06Q 30/016; A43D 1/02
See application file for complete search history.

(56) References Cited

U.S. PATENT DOCUMENTS

| | | | |
|---|---|---|---|
| 2007/0011173 A1* | 1/2007 | Agostino | ................ G06F 16/00 |
| 2009/0094138 A1 | 4/2009 | Sweitzer et al. | |
| 2011/0022639 A1 | 1/2011 | Martinsson et al. | |

(Continued)

FOREIGN PATENT DOCUMENTS

| | | |
|---|---|---|
| JP | 2007-265077 A | 10/2007 |
| JP | 2011-095906 A | 5/2011 |

(Continued)

OTHER PUBLICATIONS

Lee et al., Comparing 3D foot scanning with conventional measurement methods, Oct. 25, 2014, Journal of Foot and Ankle Research, 7:44 (Year: 2014).*

(Continued)

*Primary Examiner* — Christopher Gomez
(74) *Attorney, Agent, or Firm* — Oliff PLC

(57)          ABSTRACT

Footwear suitable for foot development of a user is properly proposed. An information processing apparatus includes an acquisition section, an estimation section, and a provision section. The acquisition section acquires measurement information at a first timing taken by measuring a foot size of a user. The estimation section estimates a first period taken until the foot size of the user meets a predetermined condition based on the measurement information at the first timing acquired by the acquisition section and a foot development pattern based on an attribute of the user at the first timing. The provision section provides information for proposing footwear in a size suitable for foot development of the user based on an estimation result by the estimation section.

22 Claims, 8 Drawing Sheets

⌐121

| USER ID | ATTRIBUTE | TIMING 1 | TIMING 2 | TIMING 3 | · · · |
|---|---|---|---|---|---|
| U11 | AGE (TIMING 1): 3 YEARS, SEX: MALE | TIME: JANUARY, 2019, FOOT LENGTH: 14 cm | TIME: OCTOBER, 2019, FOOT LENGTH: 15 cm | TIME: AUGUST, 2020, FOOT LENGTH: 16 cm | · · · |
| U21 | AGE (TIMING 1): 5 YEARS, SEX: FEMALE | TIME: FEBRUARY, 2019, FOOT LENGTH: 16 cm | TIME: APRIL, 2020, FOOT LENGTH: 17 cm | TIME: SEPTEMBER, 2021, FOOT LENGTH: 18 cm | · · · |
| · · · | · · · | · · · | · · · | · · · | · · · |

(56)　　　　　References Cited

U.S. PATENT DOCUMENTS

| | | | |
|---|---|---|---|
| 2011/0099002 A1 | 4/2011 | Sasaki et al. | |
| 2013/0311324 A1 | 11/2013 | Stoll et al. | |
| 2014/0108202 A1 | 4/2014 | Masuko | |
| 2015/0058169 A1* | 2/2015 | Arayama | G06Q 30/0623 |
| | | | 705/26.61 |
| 2018/0084078 A1 | 3/2018 | Yan | |
| 2021/0251345 A1* | 8/2021 | Kagami | A61B 5/107 |
| 2021/0345733 A1* | 11/2021 | Maezawa | A43D 1/02 |
| 2024/0119502 A1* | 4/2024 | Kusano | G06Q 30/0631 |

FOREIGN PATENT DOCUMENTS

| | | | | | |
|---|---|---|---|---|---|
| JP | 5256362 | B1 | 8/2013 | | |
| JP | 2018-101259 | A | 6/2018 | | |
| JP | 2019-045305 | A | 3/2019 | | |
| JP | 2020-154475 | A | 9/2020 | | |
| JP | 2023077479 | A * | 6/2023 | | G06Q 10/109 |
| WO | 91/17677 | A1 | 11/1991 | | |
| WO | WO-2011162760 | A1 * | 12/2011 | | A43D 1/027 |

OTHER PUBLICATIONS

Oct. 4, 2022 International Search Report for Patent Application No. PCT/JP2022/027898.

U.S. Appl. No. 18/413,316, filed Jan. 16, 2024 in the name of Ieta et al.

Oct. 4, 2022 International Search Report for Patent Application No. PCT/JP2022/027899.

U.S. Appl. No. 18/611,123, filed Mar. 20, 2024 in the name of Ieta et al.

Nov. 29, 2022 International Search Report for Patent Application No. PCT/JP2022/035837.

Aug. 22, 2025 Office Action issued in U.S. Appl. No. 18/611,123.

Huang, Shan, Zhi Wang, and Yong Jiang. "Guess your size: A hybrid model for footwear size recommendation." Advanced Engineering Informatics 36 (2018): 64-75. (Year: 2018).

* cited by examiner

FIG.2

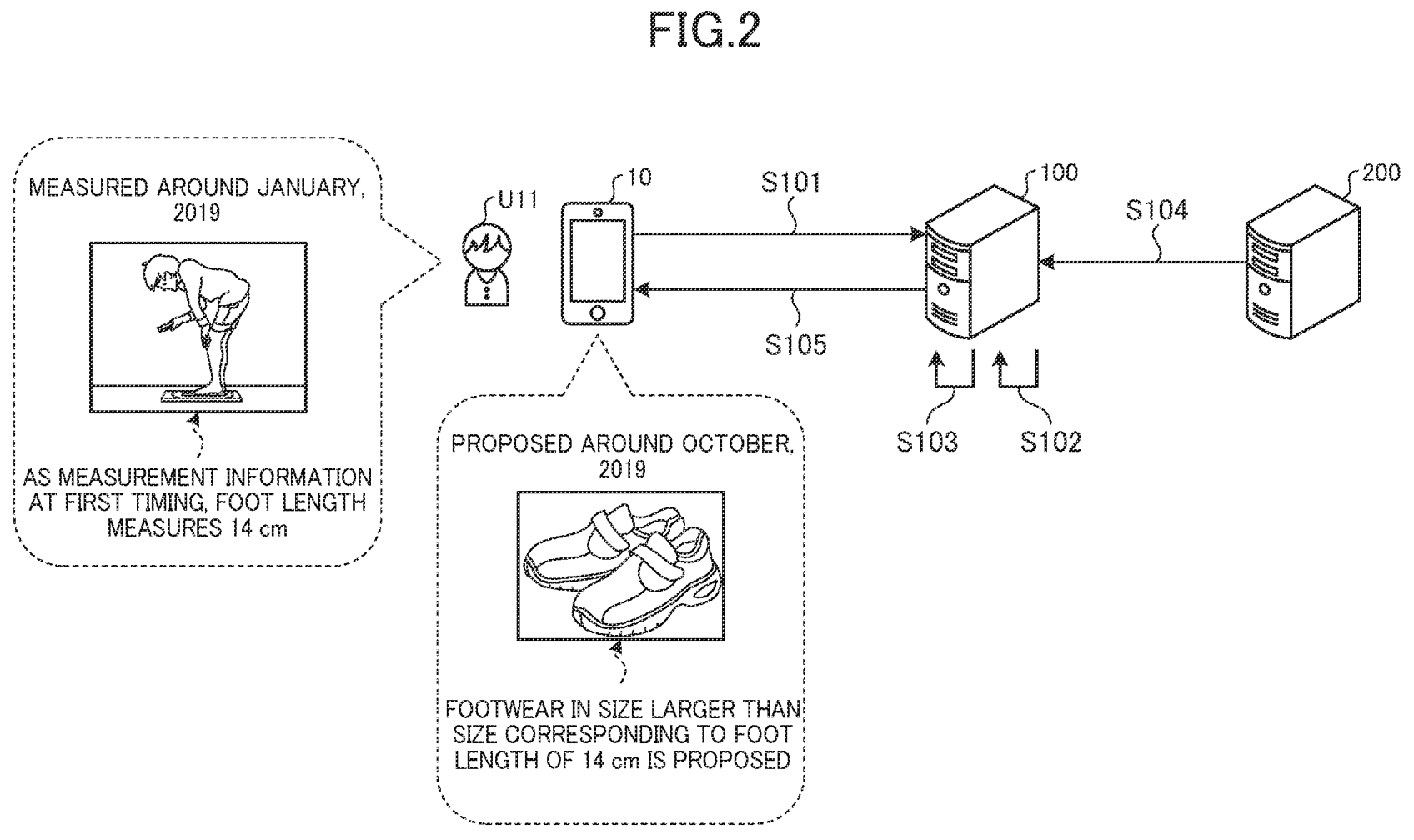

PROPOSED AROUND OCTOBER, 2019

FOOTWEAR IN SIZE LARGER THAN SIZE CORRESPONDING TO FOOT LENGTH OF 14 cm IS PROPOSED

MEASURED AROUND JANUARY, 2019

AS MEASUREMENT INFORMATION AT FIRST TIMING, FOOT LENGTH MEASURES 14 cm

| men | PERIOD TAKEN FOR FOOT LENGTH TO GROW BY 5 mm |
|---|---|
| AGE CATEGORY | AVERAGE (MONTHS) |
| 3 | 4.5 |
| 4 | 5.5 |
| 5 | AVERAGE #111 |
| 6 | AVERAGE #112 |
| 7 | AVERAGE #113 |
| 8 | AVERAGE #114 |
| 9 | AVERAGE #115 |
| 10 | AVERAGE #116 |
| 11 | AVERAGE #117 |
| 12 | AVERAGE #118 |
| 13 | AVERAGE #119 |
| 14 | AVERAGE #120 |
| 15 | AVERAGE #121 |

| women | PERIOD TAKEN FOR FOOT LENGTH TO GROW BY 5 mm |
|---|---|
| AGE CATEGORY | AVERAGE (MONTHS) |
| 3 | 4.3 |
| 4 | AVERAGE #211 |
| 5 | 6.3 |
| 6 | AVERAGE #212 |
| 7 | AVERAGE #213 |
| 8 | AVERAGE #214 |
| 9 | AVERAGE #215 |
| 10 | AVERAGE #216 |
| 11 | AVERAGE #217 |
| 12 | AVERAGE #218 |
| 13 | AVERAGE #219 |
| 14 | AVERAGE #220 |
| 15 | AVERAGE #221 |

| USER ID | ATTRIBUTE | TIMING 1 | TIMING 2 | TIMING 3 | ... |
|---------|-----------|----------|----------|----------|-----|
| U11 | AGE (TIMING 1): 3 YEARS, SEX: MALE | TIME: JANUARY, 2019, FOOT LENGTH: 14 cm | TIME: OCTOBER, 2019, FOOT LENGTH: 15 cm | TIME: AUGUST, 2020, FOOT LENGTH: 16 cm | ... |
| U21 | AGE (TIMING 1): 5 YEARS, SEX: FEMALE | TIME: FEBRUARY, 2019, FOOT LENGTH: 16 cm | TIME: APRIL, 2020, FOOT LENGTH: 17 cm | TIME: SEPTEMBER, 2021, FOOT LENGTH: 18 cm | ... |
| ... | ... | ... | ... | ... | ... |

| STATISTICAL DATA ID | STATISTICAL DATA | ... |
|---------------------|------------------|-----|
| TD11 | STATISTICAL DATA #11 | ... |
| TD21 | STATISTICAL DATA #21 | ... |
| ... | ... | ... |

| PRODUCT ID | PRODUCT INFORMATION | ... |
|---|---|---|
| IT11 | PRODUCT INFORMATION #11 | ... |
| IT21 | PRODUCT INFORMATION #21 | ... |
| ... | ... | ... |

START

↓ S201

ACQUIRE MEASUREMENT
INFORMATION AT FIRST TIMING

↓ S202

DETERMINE FOOT DEVELOPMENT
PATTERN AT FIRST TIMING

↓ S203

ESTIMATE FIRST PERIOD

↓ S204

PROVIDE INFORMATION FOR
PROPOSING FOOTWEAR BASED
ON ESTIMATION RESULT

↓

END

1000

CPU 1100    RAM 1200    ROM 1300    HDD 1400

COMMUNICATION I/F 1500    INPUT-OUTPUT I/F 1600    MEDIA I/F 1700

N    INPUT-OUTPUT DEVICES    1800

INFORMATION PROCESSING APPARATUS AND INFORMATION PROCESSING METHOD

CROSS REFERENCE TO RELATED APPLICATIONS

This application is a continuation of International Patent Application No. PCT/JP2022/027898, having an international filing date of Jul. 15, 2022, which designated the United States, the entirety of which is incorporated herein by reference. Japanese Patent Application No. 2021-124740 filed on Jul. 29, 2021 is also incorporated herein by reference in its entirety.

BACKGROUND OF THE INVENTION

For example, Japanese Unexamined Patent Application Publication No. 2007-265077 discloses a technique for estimating times when replacement purchase of children's clothing is likely to occur based on development of users, and sending product information mail.

Unfortunately, conventional techniques can not properly consider foot development of users. There is a need for a technique of proposing footwear suitable for the foot development of the users.

BRIEF DESCRIPTION OF THE DRAWINGS

FIG. 2 is a diagram illustrating an example of information processing according to the embodiment.

FIG. 3A is a table illustrating an example of statistical data of a male foot development pattern according to age.

FIG. 3B is a table illustrating an example of statistical data of a female foot development pattern according to age.

FIG. 6 is a table illustrating an example of a measurement information storage section according to the embodiment.

FIG. 7 is a table illustrating an example of a development pattern storage section according to the embodiment.

DETAILED DESCRIPTION

Figure 1:
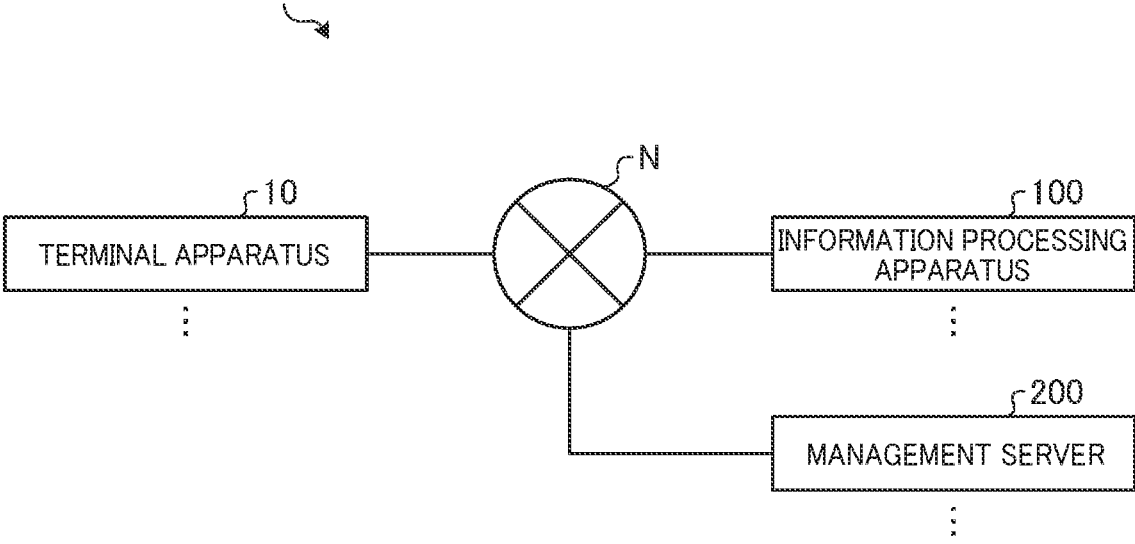
FIG. 1 is a diagram illustrating a configuration example of an information processing system according to an embodiment.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

In accordance with one of some embodiments, there is provided a n information processing apparatus comprising at least one processor or circuit comprising: an acquisition section configured to acquire measurement information at a first timing taken by measuring a foot size of a user; an estimation section configured to estimate a first period taken until the foot size of the user meets a predetermined condition based on the measurement information at the first timing acquired by the acquisition section and a foot development pattern based on an attribute of the user at the first timing; and a provision section configured to provide information for proposing footwear in a size suitable for foot development of the user based on an estimation result by the estimation section.

In accordance with one of some embodiments, there is provided an information processing method executed by a computer, the method comprising: an acquisition step of acquiring measurement information at a first timing taken by measuring a foot size of a user; an estimation step of estimating a first period taken until the foot size of the user meets a predetermined condition based on the measurement information at the first timing acquired by the acquisition step and a foot development pattern based on an attribute of the user at the first timing; and a provision step of providing information for proposing footwear in a size suitable for foot development of the user based on an estimation result by the estimation step.

Exemplary embodiments are described below. Note that the following exemplary embodiments do not in any way limit the scope of the content defined by the claims laid out herein. Note also that all of the elements described in the present embodiment should not necessarily be taken as essential elements.

Embodiment

<1. Configuration of Information Processing System>

An information processing system 1 shown in FIG. 1 is described. As shown in FIG. 1, the information processing system 1 includes a terminal apparatus 10, an information processing apparatus 100, and a management server 200. The terminal apparatus 10, the information processing apparatus 100, and the management server 200 are communicably connected by wired or wireless via a predetermined communication network (network N). FIG. 1 is a diagram illustrating a configuration example of the information processing system 1 according to the embodiment. The information processing system 1 shown in FIG. 1 may include a plurality of terminal apparatuses 10, a plurality of information processing apparatuses 100 and a plurality of management servers 200.

The terminal apparatus 10 is an information processing apparatus used by a user. The terminal apparatus 10 may be any type of apparatus if it can implement processing according to the embodiment. The terminal apparatus 10 may be an apparatus such as a smartphone, a tablet terminal, a notebook computer, a desktop computer, a mobile phone, or a PDA. In an example shown in FIG. 2, the terminal apparatus 10 is a smartphone.

For example, the terminal apparatus 10 is a smart device such as a smartphone and a tablet, and is a portable terminal apparatus that can communicate with an arbitrary server apparatus via a wireless communication network of 3rd generation (3G), long term evolution (LTE) or the like. The terminal apparatus 10 may include a screen such as a liquid crystal display having a touch panel function so as to receive various operations from the user, such as tap operation, slide operation, or scroll operation by a finger, a stylus, or the like on displayed data such as content.

In FIG. 2, the terminal apparatus 10 is used by a user U11. In the following description, the terminal apparatus 10 may be referred to as the user U11. That is, the user U11 can be read as the terminal apparatus 10 in the following description.

The information processing apparatus 100 is an information processing apparatus for performing a proposal suitable for foot development of the user in an appropriate consideration of the foot development of the user, and is implemented, for example, by a server apparatus or a cloud system. For example, the information processing apparatus 100 has a function of estimating a time period (hereinafter referred to as a "first period" as appropriate) taken until a foot size of the user meets a predetermined condition based on measurement information of measuring the foot size of the user and a foot development pattern based on an attribute of the user (e.g., age or sex).

The management server 200 is an information processing apparatus for managing a predetermined online mall that provides target footwear proposed by the information processing apparatus 100, and is implemented, for example, by a server apparatus or a cloud system. For example, the management server 200 has a function of providing information on the footwear provided at the predetermined online mall. Furthermore, the management server 200 may be an information processing apparatus for managing respective physical stores that provide the target footwear proposed by the information processing apparatus 100. For example, the management server 200 may have a function of providing information on the footwear provided at the respective physical stores. In the following embodiment, the footwear provided by the information processing apparatus 100 may be any type of footwear. For example, the footwear may be sneakers, sandals, boots, pumps, dress shoes, running shoes, or the like.

In FIG. 1, the terminal apparatus 10 and the information processing apparatus 100 are configured as separate apparatuses. However, the terminal apparatus 10 and the information processing apparatus 100 may be configured integrally. In addition, in FIG. 1, the information processing apparatus 100 and the management server 200 are configured as separate apparatuses. However, the information processing apparatus 100 and the management server 200 may be configured integrally.

<2. Example of Information Processing>

FIG. 2 is a diagram illustrating an example of information processing of the information processing system 1 according to the embodiment. In FIG. 2, a proposal is made to the user U11 via the terminal apparatus 10. In the following embodiment, the processing for proposing the footwear suitable for the foot development of the user U11 is described. The footwear suitable for the foot development of the user U11 is footwear presumed not to cause any discomfort such as that the footwear is too loose, too tight, or painful, or that a particular part protrudes from (comes out of) the footwear. The discomfort is not limited to discomfort from a viewpoint of the user U11, but may be discomfort from a viewpoint of a third party who sees the user U11 wearing the footwear, for example.

The information processing apparatus 100 acquires the measurement information of measuring the foot size of the user U11 (step S101). The following embodiment is described on the assumption that the information processing apparatus acquires the measurement information measured at an arbitrary timing, for the convenience of explanation. However, the information processing apparatus 100 may acquire measurement history information including a plurality of pieces of measurement information measured at a plurality of timings to acquire the measurement information measured at the arbitrary timing from the measurement history information. The following embodiment is described on the assumption that the information processing apparatus 100 acquires the measurement information measured at a certain timing (hereinafter referred to as a "first timing" as appropriate). The information processing apparatus 100 may acquire the measurement information of measuring the foot size of the user U11 by any method. In other words, the foot size of the user U11 may be measured by any method in the following embodiment. For example, the foot size of the user U11 may be measured via a measurement means capable of measuring a three-dimensional size of the foot based on dots (markers) on a mat where the user's foot is placed so as to image (photograph) a circumference of the foot by the terminal apparatus 10. Alternatively, for example, when the user U11 is a child, imaging may be performed with the terminal apparatus 10 used by a parent of the user U11. In such a case, the information processing apparatus 100 may acquire the measurement information of the user U11 from the patent of the user U11.

The information processing apparatus 100 determines the foot development pattern based on the attribute of the user U11 at the first timing (step S102). The attribute of the user U11 at the first timing may be the one identified based on the user information of the user U11 or the one estimated based on the measurement information at the first timing. In the latter case, for example, the attribute may be the one estimated based on a comparison between the measurement information at the first timing and statistical data TD11 or TD21 described later. Here, the foot development pattern according to the age and sex is described with reference to FIG. 3A and FIG. 3B. In particular, FIG. 3A is a table showing a foot development pattern of males according to the age, and FIG. 3B is a table showing a foot development pattern of females according to the age.

FIG. 3A shows an example of the statistical data TD11 of a time period taken for the foot length (length from a tip of a longest toe to a heel) of males to grow by 5 mm according to the age. For example, FIG. 3A shows an example where the age identified by an age category NK11 is three years, and an average time period taken for the foot length to grow by 5 mm is 4.5 months. Although FIG. 3A includes examples where conceptual information such as "average #111" or "average #112" is stored in the average of the time period taken for the foot length to grow by 5 mm, numerical values such as "4.5" for the age category of three years are stored in practice. A maximum time period or a minimum time period taken for the foot length to grow by 5 mm may be included.

FIG. 3B shows an example of the statistical data TD21 of a time period taken for the foot length of females to grow by 5 mm according to the age. For example, FIG. 3B shows an example where the age identified by an age category NK21 is three years, and an average time period taken for the foot length to grow by 5 mm is 4.3 months. Although FIG. 3A includes examples where the conceptual information such as "average #211" or "average #212" is stored in the average of the time period taken for the foot length to grow by 5 mm, the numerical values such as "4.3" for the age category of three years are stored in practice. A maximum time period or a minimum time period taken for the foot length to grow by 5 mm may be included.

The information processing apparatus 100 compares the attribute of the user U11 at the first timing with predetermined statistical data to determine the foot development pattern to apply to the user U11 at the first timing. For example, when the attribute of the user U11 at the first timing is "age: 3 years, sex: male", the information processing apparatus 100 selects the statistical data TD11 from the statistical data TD11 and TD21, and selects the age category NK11 from the statistical data TD11. Then, the information processing apparatus 100 determines the information that "the average of the time period taken for the foot length to grow by 5 mm is 4.5 months" as the foot development pattern to apply to the user U11 at the first timing.

The information processing apparatus 100 can estimate that the average of the time period taken for the foot length of the user U11 at the first timing to grow by 5 mm is 4.5 months based on the determined foot development pattern. The following embodiment is described with an example where the average of the time period taken for the foot length to grow by 5 mm is used, for the convenience of explanation.

The information processing apparatus 100 estimates the first period taken until the foot size of the user U11 meets the predetermined condition (step S103). In particular, the information processing apparatus 100 estimates the first period based on the measurement information at the first timing and the foot development pattern to be applied to the user U11 at the first timing. For example, assume that the measurement information at the first timing is a foot length of 14 cm, and the foot development pattern is "the average of the time period taken to grow by 5 mm: 4.5 months". Furthermore, for example, assume that the predetermined condition related to the estimation of the first period is a foot length of 15 cm. In this case, since a difference between the measurement information at the first timing and the predetermined condition related to the estimation of the first period is 1 cm, which is twice the length of 5 mm, the information processing apparatus 100 estimates the first period to be nine months that are twice the length of the time period taken to grow by 5 mm Meanwhile, when the attribute of the user U11 after 4.5 months from the first timing is "age: 4 years, sex: male", the information processing apparatus 100 may estimate the time period taken to grow by 1 cm to be ten months (the average period of 4.5 months for three years+ the average period of 5.5 months for four years).

The information processing apparatus 100 accesses the management server 200 (step S104). For example, the information processing apparatus 100 accesses the management server 200 managing the predetermined online mall that provides the footwear proposed or purchased at the first timing.

The information processing apparatus 100 provides the information for proposing the footwear (or proposing purchase of the footwear) corresponding to the foot size of the user U11 after a lapse of the first period based on an estimation result (step S105). As described above, the information processing apparatus 100 provides the information for proposing the footwear in the size suitable for the foot development of the user U11. For example, the information processing apparatus 100 provides the information at the timing immediately before nine months have passed, the timing before and after nine months have passed, or the timing after nine months have passed based on the estimation result estimating the first period to be nine months. Furthermore, after proving the information, the information processing apparatus 100 may provide the information (e.g., a questionnaire) for confirming whether the proposal has been appropriate. Then, the information processing apparatus 100 may change the foot development pattern to apply to the user U11 thereafter according to a response result of whether the proposal has been appropriate. Furthermore, the information processing apparatus 100 may modify the statistical data (e.g., the average time period for each age) according to the response result of whether the proposal has been appropriate. Meanwhile, the proposal may be made based on any reason, and, for example, the proposal may be made based on the reason that the footwear size proposed at the first timing is not suitable. Furthermore, the proposal is not limited to the one stating a vague reason such as that the size is not suitable or that it is better to purchase new footwear, but may be the one stating a concrete reason with an explicit indication of a specific part of the foot such as that a heel area is tight, or that the foot length has grown.

Meanwhile, there is a case that the user U11 is a child and a user who purchases the footwear using the terminal apparatus 10 is a parent of the user U11, for example. In such a case, in addition to the case of providing the information for the user U11, the information processing apparatus 100 may provide the information for a user (hereinafter referred to as a "related user" as appropriate) who has a predetermined relationship with the user U11 at the step S104. Accordingly, the user U11 can be read as the related user. Generally speaking, since the foot development of children is fast, parents may fail to notice the development and leave the footwear size unsuitable. The information processing apparatus 100 can promote usability improvement such as preventing the footwear size from remaining unsuitable.

The following describes the footwear size proposed by the information processing apparatus 100. The foot size of the user U11 after the lapse of the first period is presumed to be larger than the size at the first timing. Thus, the information processing apparatus 100 provides the information for proposing the footwear in the size larger than the footwear corresponding to the foot size based on the measurement information at the first timing at the timing immediately before the first period has passed, the timing before and after the first period has passed, or the timing after the first period has passed. For example, when the measurement information at the first timing is a foot length of 14 cm, the information processing apparatus 100 provides the information for proposing the footwear corresponding to the foot size larger than the foot length of 14 cm. For example, the information processing apparatus 100 provides the information for proposing the footwear in one size larger than the size corresponding to the foot length of 14 cm based on footwear size standards.

The information processing apparatus 100 may provide the information for proposing the same footwear in a different size or the footwear of the same brand as the footwear proposed or purchased at the first timing based on the measurement information at the first timing. For example, when the user U11 has purchased "footwear AA1 of a brand A1: size 14 cm", the information processing apparatus 100 may provide the information for proposing "footwear AA1: size 15 cm" that is the same footwear as the footwear AA1 in a different size, or "footwear AA2 of the brand A1: size 15 cm" that is the footwear of the same brand as the brand of the footwear AA1 in a different size.

The foregoing embodiment has been described with the foot length as an example of an index for indicating the foot size for the convenience of explanation. However, this example does not constitute any limitation. For example, the information processing apparatus 100 may estimate the first period based on measurement information of foot circumference or foot width of the user U11. The foot circumference and foot width have various definitions. For example, the foot circumference is defined as a length around an area from a base of a first toe (big toe) to a base of a fifth toe (little toe) or a length around boll joints at the bases of the first toe and fifth toe, and the foot width is defined as a length of a width of a widest portion. However, these examples do not constitute any limitation. Here, since development speed is different for each foot part, the first period is different for each foot part. For example, the foot circumference keeps growing after the foot length has stopped growing. Since the development speed is different for each foot part, the information processing apparatus 100 may estimate the first period taken until predetermined conditions respectively corresponding to the foot circumference and the foot width are met based on development patterns respectively corresponding to the foot circumference and the foot width.

The foregoing embodiment has been described with an example where the foot development pattern is determined based on the age and sex for the convenience of explanation. However, this example does not constitute any limitation. For example, the foot development pattern of a taller user is presumed to be faster than that of a shorter user. Furthermore, the growth of a particular foot part of a heavier user is presumed to be larger than that of a lighter user. Accordingly, the foot circumference and foot width of the heavier user are presumed to be larger (the foot development pattern is faster) than the foot circumference and foot width of the lighter user. Furthermore, the foot development pattern is presumed to be different for each race (or nationality). Furthermore, the development pattern of each foot part is also presumed to be different. The information processing apparatus 100 may determine the foot development pattern with the height, weight, race, or the like as the attribute. Furthermore, it is presumed that accuracy of determination of the foot development pattern is higher when measurement of the foot size is performed several times than once. The information processing apparatus 100 may determine the foot development pattern with a number of times of measurement of the foot size as the attribute. For example, the information processing apparatus 100 may decide whether the number of times of measurement is equal to or higher than a predetermined threshold, and when deciding that the number of times of measurement is equal to or higher than the predetermined threshold, the information processing apparatus 100 may determine the foot development pattern.

<Variation of Information Processing>

The following describes a variation of the information processing according to the embodiment.

(Consideration of Purchase Tendency)

The following describes a case where the information processing apparatus 100 makes a proposal in consideration of a purchase tendency of the user U11 in the foregoing embodiment. For example, even if the footwear in size 14 cm is proposed to the user U11 at the first timing based on the measurement information at the first timing, the footwear purchased by the user U11 may be the footwear in size 14.5 cm. When such a case happens once or several times, the information processing apparatus 100 may presume that the user U11 has a tendency to purchase the footwear in a size larger than the size suitable for the user. Then, based on the purchase tendency of the user U11 to purchase the larger size, the information processing apparatus 100 may estimate the first period to be a time period shorter by a length of time considering the purchase tendency as compared with the case not considering the purchase tendency, for example. For example, when the size of the proposed footwear is 14 cm and the size of the purchased footwear is 14.5 cm, the difference is 5 mm Accordingly, the information processing apparatus 100 may estimate the first period to be a time period shorter by a length of time corresponding to 5 mm as compared with the case not considering the purchase tendency.

The information processing apparatus 100 may provide the information for proposing the footwear in a size larger by an amount considering the purchase tendency as compared with the case not considering the purchase tendency, for example. For example, assume that the size of the proposed footwear at the first timing is 14 cm and the size of the purchased footwear is 14.5 cm. The information processing apparatus 100 may provide the information for proposing the footwear in size 15.5 cm when the footwear size to be proposed as the footwear size corresponding to the foot size of the user U11 after the lapse of the first period is 15 cm without consideration of the purchase tendency. In this case, the information processing apparatus 100 may provide the information for proposing the footwear in size 15.5 cm even if the information processing apparatus 100 has estimated the first period by setting the predetermined condition to 15 cm.

(Consideration of Stock Quantity)

The following describes a case where the information processing apparatus 100 makes a proposal in consideration of stock quantity of the footwear in the foregoing embodiment. For example, when the user U11 has purchased "footwear AA1 of a brand A1: size 14 cm", the information processing apparatus 100 provides the information, for example, for proposing "footwear AA1: size 15 cm" that is the same footwear as the footwear AA1 in a different size if the stock quantity of the footwear is not considered. However, the stock quantity of the "footwear AA1: size 15 cm" may be extremely small (or none). For example, when, of all the same footwear as the footwear AA1 in different sizes, only the stock quantity of the footwear AA1 in size 15 cm is extremely small as compared with the stock quantities of the footwear AA1 in other sizes, the information processing apparatus 100 may provide the information for proposing the footwear in size 15.5 cm that is close to the size 15 cm, or the information for proposing "footwear AA2 of the brand A1: size 15 cm" that is the footwear of the same brand as the brand of the footwear AA1.

(Change in Proposed Brand in Consideration of Attribute)

The following describes a case where the information processing apparatus 100 changes the brand of the footwear to propose in consideration of the attribute of the user U11 in the foregoing embodiment. For example, when the user U11 has purchased "footwear AA1 of a brand A1: size 14 cm", the information processing apparatus 100 provides the information, for example, for proposing "footwear AA2 of the brand A1: size 15 cm" that is the footwear of the same brand as the brand of the footwear AA1 if the attribute of the user U11 is not considered. However, a brand A2 may be more suitable for the attribute of the user U11 (the attribute of the user U11 at the first timing or the attribute of the user U11 after the lapse of the first period) than the brand A1. For example, this applies to a case that the brand A2 sets users having the same attribute as the attribute of the user U11 as target users more than the brand A1. In this case, the information processing apparatus 100 may select the footwear corresponding to the foot size of the user U11 after the lapse of the first period from the footwear of the brand A2 that is more suitable for the attribute of the user U11 than the brand A1, and provide the information for proposing the selected footwear. For example, the information processing apparatus 100 may provide the information for proposing "footwear BB 1 of the brand A2: size 15 cm". Furthermore, when a plurality of brands are more suitable for the attribute of the user U11 than the brand A1, the information processing apparatus 100 may provide the information for proposing the footwear similar to the brand A1 in design or concept.

(Provision of Incentive)

The following describes a case where the information for proposing the footwear includes information on an incentive to be provided upon purchase of the proposed footwear in the foregoing embodiment. The information processing apparatus 100 may provide the information on the incentive to be provided for the user who has purchased the proposed footwear along with the information for proposing the footwear. For example, as the information on the incentive, the information processing apparatus 100 may provide information on beneficial treatment for the user who has purchased the proposed footwear within a predetermined time period after the proposal. The incentive may be anything. For example, the incentive may be a benefit that provides free shipping for the purchase of the footwear, or a benefit that provides points usable for the purchase at the predetermined online mall. As an example of the latter case, the incentive may be a benefit that provides points equivalent to 10% of the price of the footwear upon purchase of the footwear. Furthermore, as another example of the latter case, the incentive may be a benefit that provides points equivalent to 20% of the price of the footwear upon purchase of the same footwear or the footwear of the same brand as the footwear purchased at the first timing. Furthermore, as another example of the latter case, the incentive may be a benefit that provides more points as the user makes a purchase earlier.

(Proposal for Replacement Purchase)

The following describes a case where the information processing apparatus 100 makes a proposal for replacement purchase, which includes a proposal for releasing the footwear along with or instead of a proposal for purchasing the footwear, in the foregoing embodiment. The information processing apparatus 100 may provide the information for proposing release of the footwear purchased at the first timing, which is a basis for proposing the purchase of the footwear. The information processing apparatus 100 may provide the information on the incentive to be provided for the user who has made the replacement purchased in response to the proposal. For example, as the information on the incentive, the information processing apparatus 100 may provide the information on beneficial treatment for the user who has made the proposed replacement purchase and has released the target footwear to be released within a predetermined time period after the proposal for the replacement purchase. For example, the incentive may be a benefit that provides free shipping for the replacement purchase (e.g., shipping cost for the purchased footwear and shipping cost for the footwear to be released). Furthermore, for example, the incentive may be a benefit that provides points equivalent to 10% of the price of the purchased footwear. Furthermore, for example, the incentive may be a benefit that provides points equivalent to 20% of the price of the footwear upon purchase of the same footwear or the footwear of the same brand as the footwear purchased at the first timing. Furthermore, for example, the incentive may be a benefit that provides more points as the user makes the replacement purchases earlier. Furthermore, for example, the incentive may be a benefit that sets a buying price higher than a usual price for the target footwear to be released. Furthermore, for example, the incentive may be a benefit that sets the buying price higher than the usual price for the target footwear to be released upon purchase of the same footwear or the footwear of the same brand as the footwear purchased at the first timing. Furthermore, for example, the incentive may be a benefit that sets the buying price higher than the usual price for the target footwear to be released as the user makes the replacement purchase earlier. Meanwhile, the footwear that is to be the target of the release proposal may be used longer than the first period by repair or maintenance. For example, when the footwear is made of leather, the footwear may fit the feet of the user again by reinforcing loose part of the leather to fix the looseness of the leather. When the footwear that is to be the target of the release proposal can be reinforced by repair or maintenance, the information processing apparatus 100 may estimate the first period to be a time period longer than the first period by a length of time considering the reinforcement. In this case, the information processing apparatus 100 may make a proposal for the repair or maintenance instead of the proposal for the replacement purchase.

(Proposal for Remeasurement 1)

The following describes a case where the information processing apparatus 100 makes a proposal for remeasurement of the foot size in the foregoing embodiment. Since the development speed of each individual user is different, the estimation of the first period made by the information processing apparatus 100 may not be proper. Thus, it is presumed that remeasurement of the foot size enables an accurate proposal of the footwear suitable for the foot development of the user. The information processing apparatus 100 may provide the information for proposing the remeasurement of the foot size for the user U11 at the timing immediately before the first period has passed, the timing before and after the first period has passed, or the timing after the first period has passed. The information processing apparatus 100 may provide the information on the incentive to be provided for the user who has taken the remeasurement. For example, as the information on the incentive, the information processing apparatus 100 may provide the information on beneficial treatment for the user who has taken the remeasurement within a predetermined time period after the proposal for the remeasurement. For example, the incentive may be a benefit that provides points usable for the purchase at the predetermined online mall upon remeasurement. Furthermore, for example, the incentive may be a benefit that provides more points as the user takes the remeasurement earlier.

(Proposal for Remeasurement 2)

The following describes a case where the information processing apparatus 100 provides the information for proposing the footwear suitable for the feet of the user 11 at a second timing based on re-measured measurement information at the second timing, and estimates a second period taken until the foot size meets a predetermined condition in the foregoing embodiment. The information processing apparatus 100 may acquire the measurement information of the foot size of the user U11 at the second timing, which has been measured within a predetermined time period after the proposal for the remeasurement. Then, the information processing apparatus 100 may estimate the second period based on the measurement information at the second timing and a foot development pattern based on an attribute of the user U11 at the second timing. Then, the information processing apparatus 100 may provide the information for proposing footwear in a size larger than the size of the footwear corresponding to the foot size based on the measurement information at the second timing.

The information processing apparatus 100 may provide the information for proposing the same footwear in a different size or the footwear of the same brand as the footwear proposed or purchased at the second timing based on the measurement information at the second timing. For example, when the user U11 has purchased "footwear AA1 of a brand A1: size 15 cm" proposed at the second timing based on the measurement information at the second timing, the information processing apparatus 100 may provide the information for proposing "footwear AA1: size 16 cm" that is the same footwear as the footwear AA1 in a different size, or "footwear AA2 of the brand A1: size 16 cm" that is the footwear of the same brand as the brand of the footwear AA1 in a different size at a timing immediately before the second period has passed, a timing before and after the second period has passed, or a timing after the second period has passed.

(Termination of Proposal)

The following describes a case where the information processing apparatus 100 terminates the proposal of the footwear based on the measurement information at the first timing in the foregoing embodiment. The information processing apparatus 100 may perform processing for not providing the information for proposing the footwear based on the measurement information of the foot size of the user U11 at the first timing at the timing immediately before the first period has passed, the timing before and after the first period has passed, or the timing after the first period has passed. For example, the information processing apparatus 100 may decide whether the first period has passed, and when deciding that the first period has passed, the information processing apparatus 100 may perform processing for terminating the proposal of the footwear based on the measurement information at the first timing. The information processing apparatus 100 may decide whether to terminate the proposal depending on the attribute of the user U11. For example, when the age of the user U11 is equal to or higher than the predetermined threshold (i.e., when the user U11 is an adult), the information processing apparatus 100 may decide not to perform the processing for terminating the proposal. This is because the foot size of the user U11 is presumed not to change with age. In this case, the information processing apparatus 100 may make a proposal of the same footwear as the footwear proposed at the first timing even after the first period has passed. On the contrary, when the age of the user U11 is lower than the predetermined threshold (i.e., when the user U11 is a child), the information processing apparatus 100 may decide to perform the processing for terminating the proposal. In this case, when the footwear proposed at the first timing is "footwear AA1: size 14 cm", the information processing apparatus 100 may terminate the proposal of the "footwear AA1: size 14 cm" after the lapse of the first period, and perform processing for proposing "footwear AA1: size 15 cm" that is larger in size than the "footwear AA1: size 14 cm".

(Notification of Inappropriateness)

The following describes a case where the information processing apparatus 100 notifies that the footwear specified for purchase is inappropriate in the foregoing embodiment. The information processing apparatus 100 may provide the information for notifying that the size is not suitable when the same size as the footwear size based on the measurement information of the foot size of the user U11 at the first timing is specified at the timing immediately before the first period has passed, the timing before and after the first period has passed, or the timing after the first period has passed. For example, assume that the footwear proposed based on the measurement information of the foot size of the user U11 at the first timing was "footwear AA1: size 14 cm". Although the user U11 did not purchase it at the first timing when it was proposed, the user may try to purchase it after the first period has passed. The information processing apparatus 100 may provide the information for notifying that the size is not suitable when the user specifies the footwear proposed at the first timing for purchase after the first period has passed, and the size of the specified footwear is the same as the size proposed at the first timing. The information processing apparatus 100 may decide whether to perform the processing for notifying inappropriateness depending on the attribute of the user U11. For example, when the age of the user U11 is equal to or higher than the predetermined threshold, the information processing apparatus 100 may decide not to perform the processing for notifying the inappropriateness. On the contrary, when the age of the user U11 is lower than the predetermined threshold, the information processing apparatus 100 may decide to perform the processing for notifying the inappropriateness.

(Proposal Based on Individual Development Speed)

The following describes a case where the information processing apparatus 100 makes a proposal based on the development speed of an individual user in the foregoing embodiment. Since the development speed of each individual user is different, the development speed of the feet is also different, of course. Furthermore, when the development speed of a user is fast, the development speed of the feet of the user is presumed to be fast as well. The information processing apparatus 100 may apply weighting to the foot development pattern to be applied to the user according to the development speed of the individual user. Then, the information processing apparatus 100 may estimate the first period based on the foot development pattern applied with the weighting. Furthermore, the information processing apparatus 100 may determine which to use among an average value, a maximum value, and a minimum value as a time period taken for the foot length to grow by 5 mm according to the development speed of the individual user.

(Proposal Based on Footwear Type)

The following describes a case where the information processing apparatus 100 makes a proposal in consideration of a type of footwear in the foregoing embodiment. For example, increments of available sizes may differ between cases where the footwear is sneakers or sandals. For example, in the case of sneakers, sizes are available with 5 mm increments such as 14 cm, 14.5 cm, 15 cm, 15.5 cm, and 16 cm. However, in the case of sandals, sizes are available with 1 cm increments such as 14 cm, 15 cm, and 16 cm. In the embodiment described above, the information processing apparatus 100 performs the processing for providing the information for proposing the footwear in a size larger than the footwear size corresponding to the foot size based on the measurement information at the first timing. At this time, the information processing apparatus 100 may identify the type of the footwear, estimate the increments of the available sizes based on the identified type of the footwear, and provide the information for proposing the footwear, for example, in one size larger than the footwear size corresponding to the foot size based on the measurement information at the first timing. At this time, the information processing apparatus 100 may identify the type of the footwear based on a time when the footwear was purchased at the first timing, or a time when the footwear in the size larger than the footwear size corresponding to the foot size based on the measurement information at the first timing is proposed (e.g., after the lapse of the first period). For example, it is presumed that the time when the footwear is likely to be purchased is different depending on the type of the footwear. For example, it is presumed that the sandals are likely to be purchased only in summer as compared with the sneakers. The information processing apparatus 100 may identify the type of the footwear based on the time when the footwear was purchased at the first timing, or the time when the footwear in the size larger than the footwear size corresponding to the foot size based on the measurement information at the first timing is proposed (e.g., after the lapse of the first period), estimate the increments of the available sizes based on the identified type of the footwear, and perform the proposal processing.

<3. Configuration of Terminal Apparatus>

Figure 4:
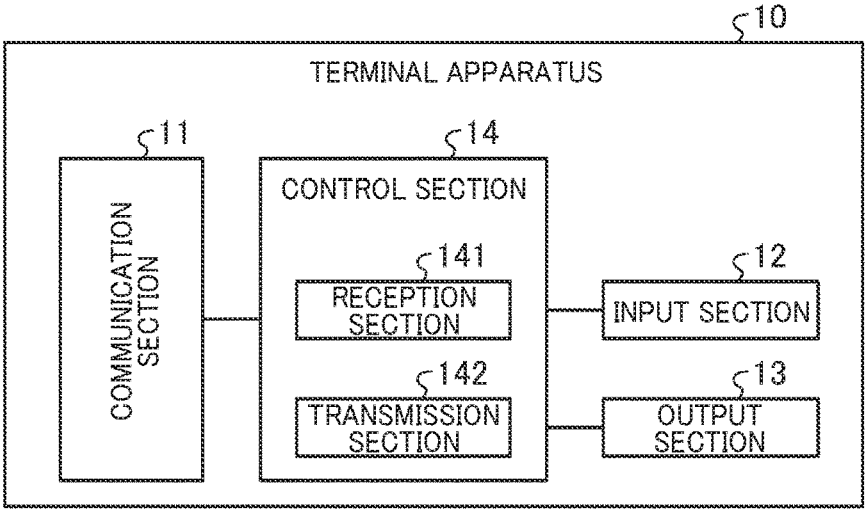
FIG. 4 is a diagram illustrating a configuration example of a terminal apparatus according to the embodiment.

Next, a configuration of the terminal apparatus 10 according to the embodiment is described with reference to FIG. 4. FIG. 4 is a diagram illustrating a configuration example of the terminal apparatus 10 according to the embodiment. As shown in FIG. 4, the terminal apparatus 10 includes a communication section 11, an input section 12, an output section 13, and a control section 14.

(Communication Section 11)

The communication section 11 is implemented by a network interface card (NIC) or the like, for example. The communication section 11 is connected to a predetermined network N by wired or wireless to transmit and receive information to/from the information processing apparatus 100 or the like via the predetermined network N.

(Input Section 12)

The input section 12 receives various operations from the user. In the example shown in FIG. 2, the input section receives the various operations from the user U11. For example, the input section 12 may receive the various operations from the user by a touch-panel function via a display screen. Furthermore, the input section 12 may receive the various operations from buttons disposed on the terminal apparatus 10 or a keyboard or a mouse connected to the terminal apparatus 10.

(Output Section 13)

The output section 13 is a display screen of a tablet terminal or the like implemented by a liquid crystal display, an organic electro-luminescence (EL) display, or the like, and is a display device for displaying various information, for example. For example, the output section 13 displays information received from the information processing apparatus 100.

(Control Section 14)

The control section 14 is, for example, a controller, and is implemented by a central processing unit (CPU), a micro processing unit (MPU), or the like that executes various programs stored in a storage device embedded in the terminal apparatus 10 using a random access memory (RAM) as a work area. For example, the various programs include application programs installed on the terminal apparatus 10. For example, the various programs include an application program to display the information received from the information processing apparatus 100. Furthermore, the control section 14 is implemented by an integrated circuit such as an application specific integrated circuit (ASIC), or a field programmable gate array (FPGA), for example.

As shown in FIG. 4, the control section 14 includes a reception section 141 and a transmission section 142, and implements or executes functions of information processing described below.

(Reception Section 141)

The reception section 141 receives various information. The reception section 141 receives the various information from external information processing apparatuses. The reception section 141 receives the various information from other information processing apparatuses such as the information processing apparatus 100. For example, the reception section 141 receives information for proposing footwear in a size suitable for foot development of the user. Furthermore, for example, the reception section 141 receives information on an incentive to receive beneficial treatment, information on a proposal for replacement purchase, information on a proposal for remeasurement, and information on an inappropriate size.

(Transmission Section 142)

The transmission section 142 transmits various information to external information processing apparatuses. The transmission section 142 transmits the various information to other information processing apparatuses such as the information processing apparatus 100. For example, the transmission section 142 transmits measurement information of a foot size of the user. For example, the transmission section 142 transmits measurement information measured via a measurement means capable of measuring a three-dimensional size of a foot based on dots on a mat by imaging a circumference of the foot by the terminal apparatus 10.

<4. Configuration of Information Processing Apparatus>

Figure 5:
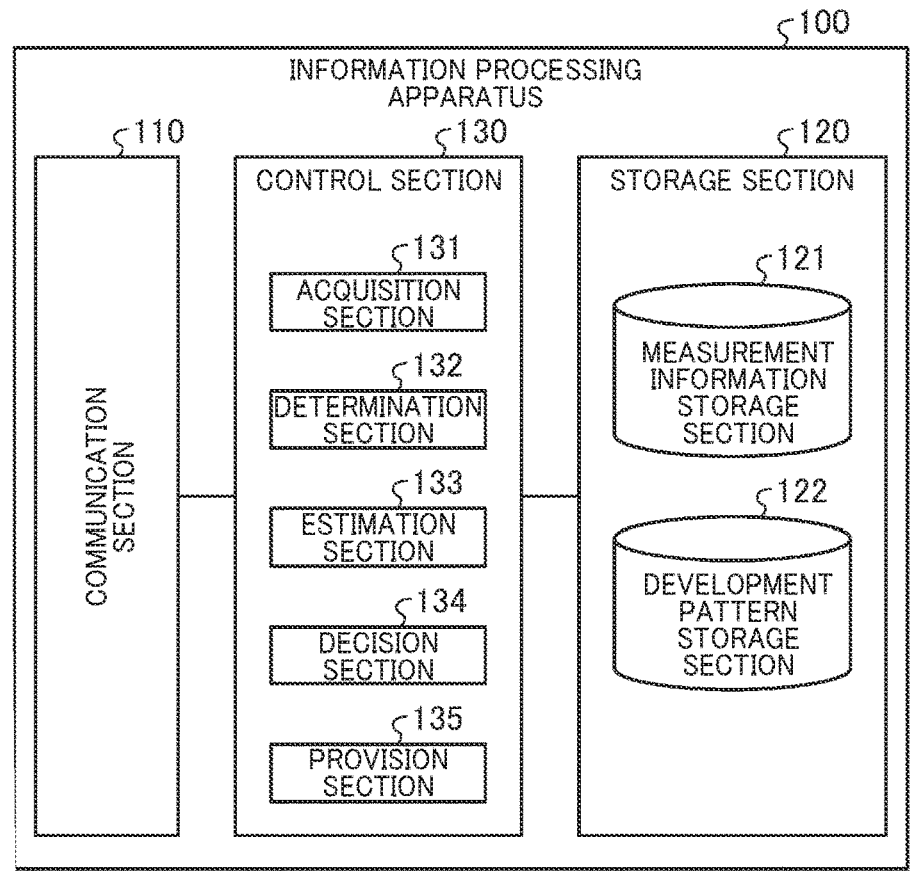
FIG. 5 is a diagram illustrating a configuration example of an information processing apparatus according to the embodiment.

Next, a configuration of the information processing apparatus 100 according to the embodiment is described with reference to FIG. 5. FIG. 5 is a diagram illustrating a configuration example of the information processing apparatus 100 according to the embodiment. As shown in FIG. 5, the information processing apparatus 100 includes a communication section 110, a storage section 120, and a control section 130. The information processing apparatus 100 may include an input section (e.g., a keyboard or a mouse) for receiving various operations from an administrator of the information processing apparatus 100, or a display section (e.g., a liquid crystal display) for displaying various information.

(Communication Section 110)

The communication section 110 is implemented by an NIC or the like, for example. The communication section 110 is connected to a network N by wired or wireless to transmit and receive information to/from the terminal apparatus 10 or the like via the network N.

(Storage Section 120)

The storage section 120 is implemented, for example, by a semiconductor memory element such as a RAM or a flash memory, or a storage device such as a hard disk or an optical disk. As shown in FIG. 5, the storage section 120 includes a measurement information storage section 121 and a development pattern storage section 122.

The measurement information storage section 121 stores measurement information of the foot size of the user. Here, FIG. 6 shows an example of the measurement information storage section 121 according to the embodiment. As shown in FIG. 6, the measurement information storage section 121 includes items such as "user ID", "attribute", "timing 1", "timing 2", and "timing 3".

The "user ID" indicates identification information for identifying the user. The "attribute" indicates an attribute of the user. The "timing 1" to "timing 3" indicate the measurement information measured at arbitrary timings.

That is, FIG. 6 shows an example where the attribute of the user identified by the user ID "U11" at the timing 1 is "age (timing 1): 3 years, sex: male", the timing 1 is "time: January, 2019, foot length: 14 cm", the timing 2 is "time: October, 2019, foot length: 15 cm", and the timing 3 is "time: August, 2020, foot length: 16 cm".

The development pattern storage section 122 stores statistical data of the foot development pattern. Here, FIG. 7 shows an example of the development pattern storage section 122 according to the embodiment. As shown in FIG. 7, the development pattern storage section 122 includes items such as "statistical data ID" and "statistical data".

The "statistical data ID" indicates identification information for identifying the statistical data of the foot development pattern. The "statistical data" indicates the statistical data of the foot development pattern. Although FIG. 7 shows examples where conceptual information such as "statistical data #11" or "statistical data #21" is stored in the "statistical data", information such as 'age: 3 years, sex: male', 'an average time period taken for a foot length to grow by 5 mm: 4.5 months' is stored, for example, in practice.

That is, FIG. 7 shows an example where the statistical data identified by the statistical data ID "TD11" is "statistical data #11".

(Control Section 130)

The control section 130 is a controller, and is implemented, for example, by a CPU, an MPU, or the like that executes various programs stored in a storage device embedded in the information processing apparatus 100 using a RAM as a work area. Furthermore, the control section 130 is a controller, and is implemented by an integrated circuit such as an ASIC or an FPGA, for example.

As shown in FIG. 5, the control section 130 includes an acquisition section 131, a determination section 132, an estimation section 133, a decision section 134, and a provision section 135, and implements or executes functions of information processing described below. An internal configuration of the control section 130 is not limited to the configuration shown in FIG. 5, and may be any other configuration if it can perform the information processing described later.

(Acquisition Section 131)

The acquisition section 131 acquires various information. The acquisition section 131 acquires the various information from external information processing apparatuses. The acquisition section 131 acquires the various information from other information processing apparatuses such as the terminal apparatus 10.

The acquisition section 131 acquires the various information from the storage section 120. The acquisition section 131 acquires the various information from the measurement information storage section 121 and the development pattern storage section 122. The acquisition section 131 also stores the acquired various information into the storage section 120. The acquisition section 131 stores the various information into the measurement information storage section 121 and the development pattern storage section 122.

The acquisition section 131 acquires measurement information of a foot size of the user. For example, the acquisition section 131 acquires the measurement information at a first timing taken by measuring the foot size of the user. Furthermore, for example, the acquisition section 131 acquires the measurement information at a second timing taken by re-measuring the foot size of the user at the timing immediately before a first period has passed, the timing before and after the first period has passed, or the timing after the first period has passed.

The acquisition section 131 acquires statistical data of the foot development pattern. For example, the acquisition section 131 acquires the statistical data of the foot development pattern according to the attribute of the user determined based on the attribute of the user. For example, the acquisition section 131 acquires the statistical data of the foot development pattern determined by the determination section 132, described later.

(Determination Section 132)

The determination section 132 determines the foot development pattern to apply to the user. For example, the determination section 132 compares the attribute of the user at the first timing with predetermined statistical data of the foot development pattern to determine the foot development pattern to apply to the user at the first timing. For example, the determination section 132 compares the attribute of the user at the first timing with the statistical data of the foot development pattern acquired by the acquisition section 131 to determine the foot development pattern to apply to the user at the first timing.

(Estimation Section 133)

The estimation section 133 estimates a time period taken until the foot size of the user meets a predetermined condition based on the measurement information acquired by the acquisition section 131 and the foot development pattern determined by the determination section 132. For example, the estimation section 133 estimates the first period based on the measurement information at the first timing and the foot development pattern based on the attribute of the user at the first timing.

The estimation section 133 estimates the time period taken until the foot size of the user meets the predetermined condition based on the foot development pattern obtained by applying the weighting according to the development speed of the individual user to the foot development pattern determined by the determination section 132.

(Decision Section 134)

The decision section 134 decides whether the time period taken until the foot size of the user meets the predetermined condition has passed. For example, the decision section 134 decides whether the first period has passed. When the decision section 134 decides that the first period has passed, the decision section 134 decides to terminate the proposal of the footwear based on the measurement information at the first timing.

The decision section 134 decides whether to perform the processing for terminating the proposal depending on the attribute of the user. For example, when the decision section 134 decides that the attribute of the user meets the predetermined condition, the decision section 134 decides not to perform the processing for terminating the proposal. On the contrary, when the decision section 134 decides that the age of the user does not meet the predetermined condition, the decision section 134 decides to perform the processing for terminating the proposal.

The decision section 134 decides whether a number of times of measurement of the foot size of the user meets a predetermined condition. Furthermore, when the decision section 134 decides that the number of times of measurement meets the predetermined condition, the decision section 134 decides to determine the foot development pattern.

(Provision Section 135)

The provision section 135 provides (transmits) the information for proposing the footwear in the size suitable for the foot development of the user based on an estimation result by the estimation section 133. The provision section 135 provides the information for proposing the footwear in a size larger than the size of the footwear corresponding to the foot size based on the measurement information at an arbitrary timing.

The provision section 135 provides the information for proposing the same footwear in a different size or the footwear of the same brand as the footwear proposed or purchased at an arbitrary timing.

The provision section 135 provides information on an incentive to be provided for the user who has purchased the proposed footwear. For example, the provision section 135 provides information on beneficial treatment for the user who has purchased the proposed footwear within a predetermined time period after the proposal.

The provision section 135 provides information for proposing replacement purchase that includes releasing the footwear purchased at an arbitrary timing and purchasing the proposed footwear. Furthermore, the provision section 135 provides information on beneficial treatment for the user who has made the replacement purchase to replace the proposed footwear within a predetermined time period after the proposal.

The provision section 135 performs processing for not providing the information for proposing the footwear based on the measurement information of the foot size of the user at an arbitrary timing. For example, the provision section 135 provides the information for terminating the proposal of the footwear based on the measurement information of the foot size of the user at an arbitrary timing.

The provision section 135 notifies that the footwear specified for purchase is inappropriate. For example, the provision section 135 notifies that the size is not suitable when the same size as the footwear size based on the measurement information of the foot size of the user at an arbitrary timing is specified.

<5. Configuration of Management Server>

Figures 8, 9:
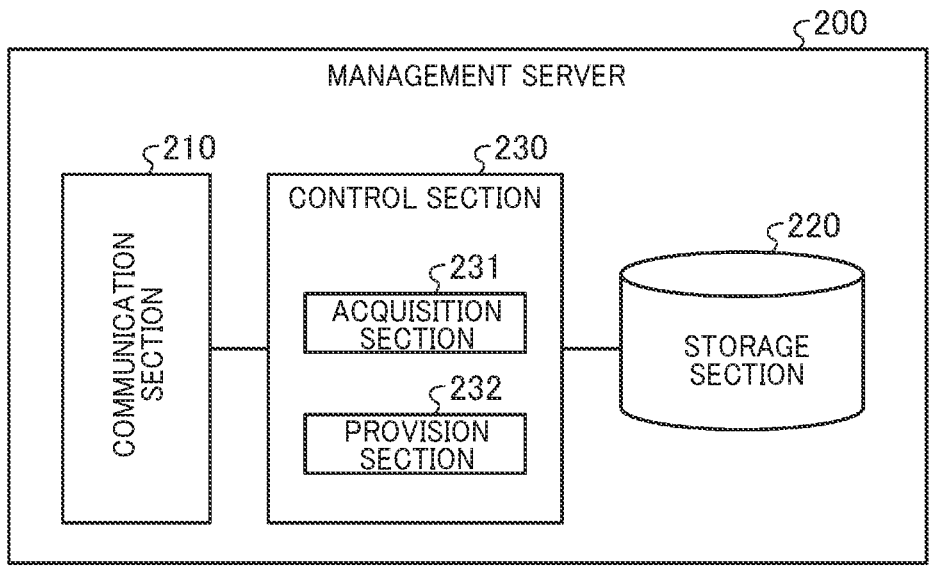
FIG. 8 is a diagram illustrating a configuration example of a management server according to the embodiment.
FIG. 9 is a table illustrating an example of a product information storage section according to the embodiment.

Next, a configuration of the management server 200 according to the embodiment is described with reference to FIG. 8. FIG. 8 is a diagram illustrating a configuration example of the management server 200 according to the embodiment. As shown in FIG. 8, the management server 200 includes a communication section 210, a storage section 220, and a control section 230. The management server 200 may include an input section for receiving various operations from an administrator of the management server 200, or a display section for displaying various information.

(Communication Section 210)

The communication section 210 is implemented by an NIC or the like, for example. The communication section 210 is connected to a network N by wired or wireless to transmit and receive information to/from the information processing apparatus 100 or the like via the network N.

(Storage Section 220)

The storage section 220 is implemented, for example, by a semiconductor memory element such as a RAM or a flash memory, or a storage device such as a hard disk or an optical disk.

The storage section 220 stores product information on products provided at a predetermined online mall. Here, FIG. 9 shows an example of the storage section 220 according to the embodiment. As shown in FIG. 9, the storage section 220 includes items such as "product ID", and "product information".

The "product ID" indicates identification information for identifying the product provided at the predetermined online mall. The "product information" indicates the product information of the product provided at the predetermined online mall. Although FIG. 9 shows examples where conceptual information such as "product information #11" or "product information #21" is stored in the "product information", information such as "brand: A1, size: 13 cm, 13.5 cm, 14 cm, 14.5 cm . . . " is stored in practice.

That is, FIG. 9 shows an example where the product information identified by the product ID "IT11" is "product information #11".

(Control Section 230)

The control section 230 is a controller, and is implemented, for example, by a CPU, an MPU, or the like that executes various programs stored in a storage device embedded in the management server 200 using a RAM as a work area. Furthermore, the control section 230 is a controller, and is implemented by an integrated circuit such as an ASIC or an FPGA, for example.

As shown in FIG. 8, the control section 230 includes an acquisition section 231 and a provision section 232, and implements or executes functions of information processing described below. An internal configuration of the control section 230 is not limited to the configuration shown in FIG. 8, and may be any other configuration if it can perform the information processing described later.

(Acquisition Section 231)

The acquisition section 231 acquires various information. The acquisition section 231 acquires the various information from external information processing apparatuses. The acquisition section 231 acquires the various information from other information processing apparatuses such as the information processing apparatus 100.

The acquisition section 231 acquires the various information from the storage section 220. The acquisition section 231 also stores the acquired various information into the storage section 220.

The acquisition section 231 acquires the product information on the products provided at the predetermined online mall.

(Provision Section 232)

The provision section 232 provides (transmits) information acquired by the acquisition section 231. For example, in response to a request for providing the product information received from the information processing apparatus 100, the provision section 232 transmits the product information of the corresponding product to the information processing apparatus 100.

<6. Information Processing Flow>

Figure 10:
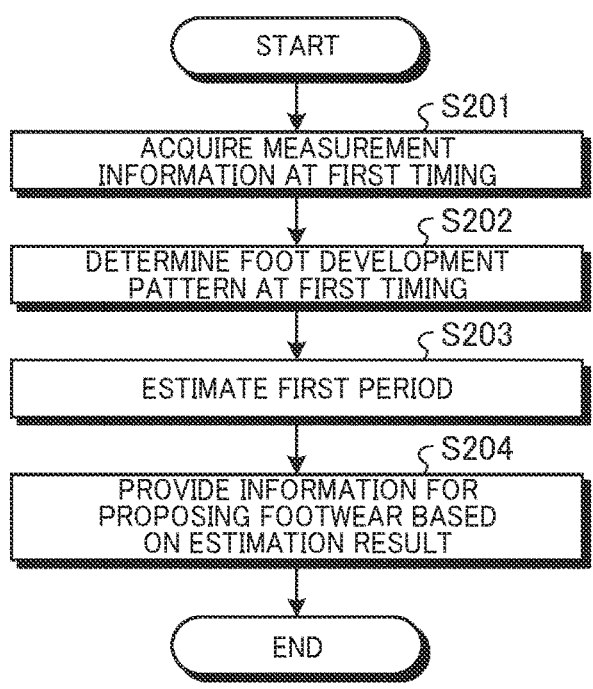
FIG. 10 is a flowchart illustrating an example of information processing according to the embodiment.

Next, a process of the information processing by the information processing system 1 according to the embodiment is described with reference to FIG. 10. FIG. 10 is a flowchart illustrating the process of the information processing by the information processing system 1 according to the embodiment.

As shown in FIG. 10, an information processing apparatus 100 acquires measurement information at a first timing taken by measuring a foot size of a user (step S201). Then, the information processing apparatus 100 provides information for proposing footwear suitable for the feet of the user at the first timing.

The information processing apparatus 100 determines a foot development pattern to apply to the user at the first timing (step S202).

The information processing apparatus 100 estimates a first period taken until the foot size of the user meets a predetermined condition based on the measurement information at the first timing and the foot development pattern at the first timing (step S203).

The information processing apparatus 100 provides information for proposing footwear corresponding to a foot size of the user after a lapse of the first period (step S204).

<7. Advantageous Effects>

As described above, an information processing apparatus 100 according to the embodiment includes an acquisition section 131, an estimation section 133, and a provision section 135. The acquisition section 131 acquires measurement information at a first timing taken by measuring a foot size of a user. The estimation section 133 estimates a first period taken until the foot size of the user meets a predetermined condition based on the measurement information at the first timing acquired by the acquisition section 131 and a foot development pattern based on an attribute of the user at the first timing. The provision section 135 provides information for proposing footwear in a size suitable for foot development of the user based on an estimation result by the estimation section 133.

As a result, the information processing apparatus 100 according to the embodiment can properly propose the footwear suitable for the foot development of the user.

Furthermore, the provision section 135 provides information for proposing footwear in a size larger than a size of footwear corresponding to the foot size based on the measurement information at the first timing.

As a result, the information processing apparatus 100 according to the embodiment can properly propose the footwear in the larger size according to the foot development of the user.

Furthermore, the provision section 135 provides information for proposing same footwear in a different size or footwear of a same brand as footwear proposed at the first timing based on the measurement information at the first timing.

As a result, the information processing apparatus 100 according to the embodiment can promote improvement in purchasing effect of the same footwear as the footwear proposed at the first timing, or the footwear related thereto.

Furthermore, the provision section 135 provides information for proposing same footwear in a different size or footwear of a same brand as footwear purchased at the first timing based on the measurement information at the first timing.

As a result, the information processing apparatus 100 according to the embodiment can promote improvement in purchasing effect of the same footwear as the footwear purchased at the first timing, or the footwear related thereto.

Furthermore, the provision section 135 provides the information including information on beneficial treatment for the user who has purchased the proposed footwear within a predetermined time period after the proposal.

As a result, the information processing apparatus 100 according to the embodiment can promote improvement in purchasing effect of the proposed footwear.

Furthermore, the provision section 135 provides information for proposing replacement purchase that includes releasing the footwear purchased at the first timing based on the measurement information at the first timing and purchasing the proposed footwear.

As a result, the information processing apparatus 100 according to the embodiment can properly propose the footwear suitable for the foot development of the user, and also the replacement purchase.

Furthermore, the provision section 135 provides the information including the information on the beneficial treatment for the user who has released the footwear proposed to be replaced within a predetermined time period after the proposal for the replacement purchase.

As a result, the information processing apparatus 100 according to the embodiment can promote improvement in purchasing effect of the footwear proposed to be replaced.

Furthermore, the provision section 135 provides the information including the information on the beneficial treatment for the user who has re-measured the foot size at the timing immediately before the first period has passed, the timing before and after the first period has passed, or the timing after the first period has passed.

As a result, the information processing apparatus 100 according to the embodiment can promote increase of motivation of the user for remeasurement.

Furthermore, the provision section 135 does not provide the information for proposing the footwear based on the measurement information at the first timing at the timing immediately before the first period has passed, the timing before and after the first period has passed, or the timing after the first period has passed.

As a result, the information processing apparatus 100 according to the embodiment can properly propose only the footwear suitable for the foot development of the user.

Furthermore, the provision section 135 provides information for notifying that a size is not suitable when a same size as the size of the footwear corresponding to the foot size based on the measurement information at the first timing is specified at the timing immediately before the first period has passed, the timing before and after the first period has passed, or the timing after the first period has passed.

As a result, the information processing apparatus 100 according to the embodiment can properly notify unsuitable footwear for the foot development of the user.

Furthermore, the estimation section 133 estimates the first period based on a foot development pattern applied with weighting according to development speed of an individual user.

As a result, the information processing apparatus 100 according to the embodiment can properly propose the footwear suitable for the development speed of the individual user.

Furthermore, the acquisition section 131 acquires measurement information at a second timing taken by re-measuring the foot size within a predetermined time period after the first period has passed. Furthermore, the estimation section 133 estimates a second period taken until the foot size of the user meets a predetermined condition based on the measurement information at the second timing acquired by the acquisition section 131 and a foot development pattern based on an attribute of the user at the second timing. Furthermore, the provision section 135 provides information for proposing footwear in a size larger than a size of footwear corresponding to the foot size based on the measurement information at the second timing.

As a result, the information processing apparatus 100 according to the embodiment can properly and periodically propose the footwear suitable for the foot development of the user.

Furthermore, the provision section 135 provides information for proposing same footwear in a different size or footwear of a same brand as the footwear proposed at the second timing based on the measurement information at the second timing.

As a result, the information processing apparatus 100 according to the embodiment can promote improvement in purchasing effect of the same footwear as the footwear proposed at the second timing based on the measurement information at the second timing, or the footwear related thereto.

Furthermore, the provision section 135 provides information for proposing same footwear in a different size or footwear of a same brand as footwear purchased at the second timing based on the measurement information at the second timing.

As a result, the information processing apparatus 100 according to the embodiment can promote improvement in purchasing effect of the same footwear as the footwear purchased at the second timing based on the measurement information at the second timing, or the footwear related thereto.

<8. Hardware Configuration>

Figure 11:
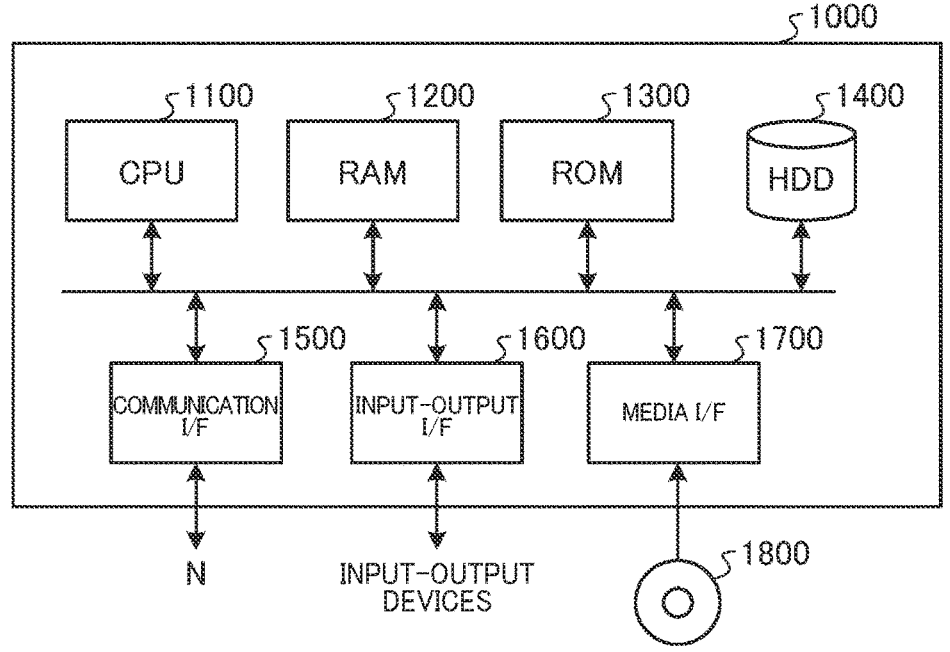
FIG. 11 is a diagram illustrating a hardware configuration of an example of a computer that implements functions of the information processing apparatus.

Furthermore, the terminal apparatus 10, the information processing apparatus 100, and the management server 200 according to the embodiment as described above are implemented by a computer 1000 having a configuration shown in FIG. 11, for example. FIG. 11 is a diagram illustrating a hardware configuration of an example of the computer implementing functions of the terminal apparatus 10, the information processing apparatus 100, and the management server 200. The computer 1000 includes a CPU 1100, a RAM 1200, a ROM 1300, an HDD 1400, a communication interface (UF) 1500, an input-output interface (UF) 1600, and a media interface (UF) 1700.

The CPU 1100 operates based on programs stored in the ROM 1300 or the HDD 1400 to control respective sections. The ROM 1300 stores a boot program executed by the CPU 1100 to boot the computer 1000, programs dependent on the hardware of the computer 1000, or the like.

The HDD 1400 stores programs executed by the CPU 1100, data used by these programs, or the like. The communication interface 1500 receives data from other devices via a predetermined communication network to transmit the data to the CPU 1100, and transmits data generated by the CPU 1100 to other devices via the predetermined communication network.

The CPU 1100 controls an output device such as a display or a printer, and an input device such as a keyboard or a mouse via the input-output interface 1600. The CPU 1100 acquires data from the input device via the input-output interface 1600. Furthermore, the CPU 1100 outputs the generated data to the output device via the input-output interface 1600.

The media interface 1700 reads out programs or data stored in a recording medium 1800, and provides the programs or data to the CPU 1100 via the RAM 1200. The CPU 1100 loads these programs from the recording medium 1800 to the RAM 1200 via the media interface 1700, and executes the loaded programs. The recording medium 1800 includes, for example, an optical recording medium such as a digital versatile disc (DVD) or a phase-change-rewritable disk (PD), a magneto-optical recording medium such as a magneto-optical (MO) disk, a tape medium, a magnetic recording medium, a semiconductor memory, or the like.

For example, when the computer 1000 functions as the terminal apparatus 10, the information processing apparatus 100, and the management server 200 according to the embodiment, the CPU 1100 of the computer 1000 executes the programs loaded on the RAM 1200 to implement functions of the control sections 14, 130, and 230. Although the CPU 1100 of the computer 1000 reads out these programs from the recording medium 1800 to execute, the computer may acquire these programs from other devices via a predetermined network, as an alternative example.

<9. Others>

Furthermore, among the processing described in the embodiment above, the processing described to be performed automatically can be entirely or partly performed manually, or the processing described to be performed manually can be entirely or partly performed automatically by known methods. Moreover, the processing processes, specific names, information including various data or parameters described or shown in the foregoing description or drawings can be changed arbitrarily unless otherwise specified. For example, various information shown in the drawings is not limited to the information shown in the drawings.

Furthermore, the components of the apparatuses shown in the drawings are function concepts, and do not have to be physically configured as shown in the drawings. That is, a specific form of dispersion/integration of the apparatuses is not limited to the forms shown in the drawings, and the apparatuses can be entirely or partly configured to be functionally or physically dispersed/integrated in any unit according to various loads, usage conditions, or the like.

Furthermore, the embodiments described above can be combined as appropriate within a range not causing any contradiction in the processing content.

As described above, some of the embodiments of the present application have been described in detail based on the drawings, but these are examples, and the present disclosure can be implemented in other modes that have been modified and improved in various ways based on the knowledge of those skilled in the art, including the aspects described in the section of the summery of the invention.

Furthermore, the "section", "module", or "unit" described above can be read as a "means" or "circuit". For example, the acquisition section can be read as an acquisition means or an acquisition circuit.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

The invention claimed is:

1. A system including:

a mat having position markers;

an imaging device configured to capture images of a user's foot positioned on the mat; and an information processing apparatus comprising at least one processor or circuit, the at least one processor or circuit being configured to:

determine three-dimensional foot measurements based on the position markers in the captured images to generate measurement information;

acquire the measurement information at a first timing taken by measuring a foot size of the user;

determine a purchase tendency of the user by comparing sizes of footwear previously proposed to the user with sizes of footwear actually purchased by the user;

estimate a first period taken until the foot size of the user meets a predetermined condition based on the measurement information at the first timing and a foot development pattern based on an attribute of the user at the first timing to determine an estimation result;

adjust the estimation of the first period based on the determined purchase tendency; and provide information for proposing footwear in a size suitable for foot development of the user based on the estimation result.

2. The system according to claim 1, wherein the at least one processor or circuit provides information for proposing footwear in a size larger than footwear corresponding to the foot size based on the measurement information at the first timing.

3. The system according to claim 2, wherein the at least one processor or circuit provides information for proposing same footwear in a different size or footwear of a same brand as footwear proposed at the first timing based on the measurement information at the first timing.

4. The system according to claim 2, wherein the at least one processor or circuit provides information for proposing same footwear in a different size or footwear of a same brand as footwear purchased at the first timing based on the measurement information at the first timing.

5. The system according to claim 1, wherein the at least one processor or circuit provides the information including information on beneficial treatment for the user who has purchased the proposed footwear within a predetermined time period after the proposal.

6. The system according to claim 1, wherein the at least one processor or circuit provides information for proposing replacement purchase that includes releasing the footwear purchased at the first timing based on the measurement information at the first timing and purchasing the proposed footwear.

7. The system according to claim 6, wherein the at least one processor or circuit provides the information including the information on the beneficial treatment for the user who has released the footwear proposed to be replaced within a predetermined time period after the proposal for the replacement purchase.

8. The system according to claim 1, wherein the at least one processor or circuit provides the information including information on beneficial treatment for the user who has re-measured the foot size at a timing immediately before the first period has passed.

9. The system according to claim 1, wherein the at least one processor or circuit provides the information including information on beneficial treatment for the user who has re-measured the foot size at a timing before and after the first period has passed.

10. The system according to claim 1, wherein the at least one processor or circuit provides the information including information on beneficial treatment for the user who has re-measured the foot size at a timing after the first period has passed.

11. The system according to claim 1, wherein the at least one processor or circuit does not provide the information for proposing the footwear based on the measurement information at the first timing at a timing immediately before the first period has passed.

12. The system according to claim 1, wherein the at least one processor or circuit does not provide the information for proposing the footwear based on the measurement information at the first timing at a timing before and after the first period has passed.

13. The system according to claim 1, wherein the at least one processor or circuit does not provide the information for proposing the footwear based on the measurement information at the first timing at a timing after the first period has passed.

14. The system according to claim 1, wherein the at least one processor or circuit provides information for notifying that a size is not suitable when a same size as a footwear size corresponding to the foot size based on the measurement information at the first timing is specified at a timing immediately before the first period has passed.

15. The system according to claim 1, wherein the at least one processor or circuit provides information for notifying that a size is not suitable when a same size as a footwear size corresponding to the foot size based on the measurement information at the first timing is specified at a timing before and after the first period has passed.

16. The system according to claim 1, wherein the at least one processor or circuit provides information for notifying that a size is not suitable when a same size as a footwear size corresponding to the foot size based on the measurement information at the first timing is specified at a timing after the first period has passed.

17. The system according to claim 1, wherein the at least one processor or circuit estimates the first period based on a foot development pattern applied with weighting according to development speed of an individual user.

18. The system according to claim 1, wherein the at least one processor or circuit acquires measurement information at a second timing taken by re-measuring the foot size within a predetermined time period after the first period has passed, wherein the at least one processor or circuit estimates a second period taken until the foot size of the user meets a predetermined condition based on the measurement information at the second timing acquired by the at least one processor or circuit and a foot development pattern based on an attribute of the user at the second timing, and wherein the at least one processor or circuit provides information for proposing footwear in a size larger than footwear corresponding to the foot size based on the measurement information at the second timing.

19. The system according to claim 18, wherein the at least one processor or circuit provides information for proposing same footwear in a different size or footwear of a same brand as footwear proposed at the second timing based on the measurement information at the second timing.

20. The system according to claim 18, wherein the at least one processor or circuit provides information for proposing same footwear in a different size or footwear of a same brand as footwear purchased at the second timing based on the measurement information at the second timing.

21. An information processing method executed by a system including a computer, a mat having position markers, and an imaging device configured to capture images of a user's foot positioned on the mat, the method comprising:

a determination step of determining three-dimensional foot measurements based on the position markers in the captured images to generate measurement information;

an acquisition step of acquiring the measurement information at a first timing taken by measuring a foot size of the user;

a purchase tendency determination step of determining a purchase tendency of the user by comparing sizes of footwear previously proposed to the user with sizes of footwear actually purchased by the user;

an estimation step of estimating a first period taken until the foot size of the user meets a predetermined condition based on the measurement information at the first timing acquired by the acquisition step and a foot development pattern based on an attribute of the user at the first timing to determine an estimation result;

an adjustment step of adjusting the estimation of the first period based on the determined purchase tendency; and a provision step of providing information for proposing footwear in a size suitable for foot development of the user based on the estimation result.

22. The system according to claim 1, wherein the at least one processor or circuit is further configured to:

provide information for confirming whether the proposal has been appropriate after providing the information for proposing footwear, and change the foot development pattern to apply to the user according to a response result of whether the proposal has been appropriate.

* * * * *

26